(12) United States Patent
Petel et al.

(10) Patent No.: US 9,990,790 B2
(45) Date of Patent: Jun. 5, 2018

(54) UNIT FOR COMMUNICATION BY MEANS OF A PREDETERMINED PROTOCOL

(75) Inventors: Laurent Petel, Creteil (FR); Eric Menard, Creteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 138 days.

(21) Appl. No.: 14/115,635

(22) PCT Filed: May 4, 2012

(86) PCT No.: PCT/EP2012/058188
§ 371 (c)(1),
(2), (4) Date: Feb. 4, 2014

(87) PCT Pub. No.: WO2012/150315
PCT Pub. Date: Nov. 8, 2012

(65) Prior Publication Data
US 2014/0152423 A1    Jun. 5, 2014

(30) Foreign Application Priority Data

May 5, 2011   (FR) ..................... 11 01397

(51) Int. Cl.
*G07C 9/00* (2006.01)
*H04B 5/00* (2006.01)
(Continued)

(52) U.S. Cl.
CPC ....... *G07C 9/00309* (2013.01); *H04B 5/0025* (2013.01); *H04L 67/12* (2013.01);
(Continued)

(58) Field of Classification Search
CPC ....... G07C 9/00; G07C 9/00309; H04W 4/00; H04W 4/008; H04W 52/0229;
(Continued)

(56) References Cited

U.S. PATENT DOCUMENTS

2005/0024181 A1   2/2005 Hofbeck et al.
2006/0128305 A1*  6/2006 Delalat ............. G08B 13/1418
                                                    455/41.2
(Continued)

FOREIGN PATENT DOCUMENTS

DE         199 01 364 A1    7/1999
DE      10 2008 039 156 A1    2/2010
WO         2009/090086 A1    7/2009

OTHER PUBLICATIONS

Bluetooth, Specification of the Bluetooth System for Version 2.0+EDC, Nov. 4, 2004, and all pertinent pages are detailed in the Office action.*

(Continued)

*Primary Examiner* — Brian Wilson
(74) *Attorney, Agent, or Firm* — Osha Liang LLP

(57) ABSTRACT

The invention relates to a unit (SYST) for communication by means of a predetermined protocol, said communication unit (SYST) including: a master device (EQ_MAI); and a slave device (EQU_ESC) capable of communicating with a vehicle according to a UHF or BF protocol, and capable of assuming a plurality of states, characterized in that the master device (EQ_MAI) is suitable for sending, to the slave device (EQU_ESC), alerts pertaining to the actuation of a state.

8 Claims, 4 Drawing Sheets

(51) Int. Cl.
*H04W 4/00* (2018.01)
*H04W 52/02* (2009.01)
*H04L 29/08* (2006.01)
*H04M 1/725* (2006.01)
*H04W 84/20* (2009.01)
*H04L 29/06* (2006.01)

(52) U.S. Cl.
CPC ............ *H04L 67/125* (2013.01); *H04W 4/80* (2018.02); *H04W 52/0229* (2013.01); *H04L 69/28* (2013.01); *H04M 1/7253* (2013.01); *H04M 1/72533* (2013.01); *H04M 2250/02* (2013.01); *H04M 2250/04* (2013.01); *H04W 84/20* (2013.01); *Y02D 70/00* (2018.01); *Y02D 70/144* (2018.01); *Y02D 70/166* (2018.01); *Y02D 70/42* (2018.01)

(58) Field of Classification Search
CPC ....... H04W 84/20; H04B 5/00; H04B 5/0025; H04L 67/125; H04L 67/12; H04L 69/28; H04M 2250/04; H04M 2250/02; H04M 1/7253; H04M 1/72533; Y02B 60/50
USPC ..... 340/426.16, 426.17, 426.35, 426.36, 5.1, 340/5.2, 5.28, 5.6, 5.63, 5.64, 5.7, 5.71, 340/5.72; 455/41.1, 41.2, 66.1; 4/426.16, 426.17, 426.35, 426.36, 5.1, 4/5.2, 5.28, 5.6, 5.63, 5.64, 5.7, 5.71, 4/5.72
See application file for complete search history.

(56) References Cited

U.S. PATENT DOCUMENTS

| | | | | |
|---|---|---|---|---|
| 2007/0226778 | A1* | 9/2007 | Pietruszka | H04L 63/104 726/2 |
| 2009/0096575 | A1* | 4/2009 | Tieman | G07C 9/00309 340/5.62 |
| 2010/0227556 | A1* | 9/2010 | Kim | H04W 4/08 455/41.2 |
| 2010/0277304 | A1* | 11/2010 | Haartsen | G06F 1/3215 340/531 |

OTHER PUBLICATIONS

International Search Report for corresponding International Application No. PCT/EP2012/058188, dated Jun. 19, 2012 (3 pages).
Johnson Consulting: "Bluetooth—An Overview—How networks are formed and controlled—The Various States of Bluetooth units", Apr. 17, 2004, pp. 1-3, XP002668834, Retrieved from Internet: URL: http://www.swedetrack.com/images/bluet10.htm.

* cited by examiner

| | Address | | Type | | Value | Permissions |
|---|---|---|---|---|---|---|
| | hexadecimal | decimal | hexadecimal | name | | |
| 1 | 000F | 15 | 0x2800 | GATT_PRIMARY_SERVICE_UUID | 00:FE | GATT_PERMIT_READ |
| 2 | 0010 | 16 | 0x2803 | GATT_CHARACTER_UUID | 1A:11:00:01:FE | GATT_PERMIT_READ |
| 3 | 0011 | 17 | 0xFE01 | CLOCK_HHMMSS_UUID | 00:00:00 | GATT_PERMIT_WRITE | GATT_PERMIT_READ |
| 4 | 0012 | 18 | 0x2902 | GATT_CLIENT_CHAR_CFG_UUID | 01:00 | GATT_PERMIT_WRITE | GATT_PERMIT_READ |
| 5 | 0013 | 19 | 0x2901 | GATT_CHAR_USER_DESC_UUID | clock_sync | GATT_PERMIT_READ |
| 6 | 0014 | 20 | 0x2803 | GATT_CHARACTER_UUID | 0A:15:00:02:FE | GATT_PERMIT_READ |
| 7 | 0015 | 21 | 0xFE02 | CLOCK_HHMMSS_UUID | 00:00:00 | GATT_PERMIT_WRITE | GATT_PERMIT_READ |
| 8 | 0016 | 22 | 0x2901 | GATT_CHAR_USER_DESC_UUID | alarm_dis | GATT_PERMIT_READ |
| 9 | 0017 | 23 | 0x2803 | GATT_CHARACTER_UUID | 02:18:00:03:FE | GATT_PERMIT_READ |
| 10 | 0018 | 24 | 0xFE03 | CLOCK_HHMMSS_UUID | 00:00:00 | GATT_PERMIT_WRITE | GATT_PERMIT_READ |
| 11 | 0019 | 25 | 0x2901 | GATT_CHAR_USER_DESC_UUID | alarm_idle | GATT_PERMIT_READ |
| 12 | 001A | 26 | 0x2804 | GATT_CHARACTER_UUID | 02:1B:00:04:FE | GATT_PERMIT_READ |
| 13 | 001B | 27 | 0xFE04 | RAW_BYTE_UUID | 00 | GATT_PERMIT_READ |
| 14 | 001C | 28 | 0x2901 | GATT_CHAR_USER_DESC_UUID | schedule_control | GATT_PERMIT_READ |

Fig. 3

| Address (hexadecimal) | Address (decimal) | Type (hexadecimal) | Type | Value | Permissions |
|---|---|---|---|---|---|
| 000F | 15 | 0x2800 | GATT_PRIMARY_SERVICE_UUID | 00:FD | GATT_PERMIT_READ |
| 0010 | 16 | 0x2803 | GATT_CHARACTER_UUID | 0A:11:00:01:FD | GATT_PERMIT_READ |
| 0011 | 17 | 0xFD01 | CLOCK_HHMMSS_UUID | 00:00:00 | GATT_PERMIT_WRITE\|GATT_PERMIT_READ |
| 0012 | 18 | 0x2901 | GATT_CLIENT_CHAR_DESC_UUID | alrm_ii | GATT_PERMIT_READ |
| 0013 | 19 | 0x2803 | GATT_CHARACTER_UUID | 1A:14:00:02:FD | GATT_PERMIT_READ |
| 0014 | 20 | 0xFD02 | CLOCK_HHMMSS_UUID | 00:00 | GATT_PERMIT_WRITE\|GATT_PERMIT_READ |
| 0015 | 21 | 0x2902 | GATT_CLIENT_CHAR_CFG_UUID | 01:00 | GATT_PERMIT_WRITE\|GATT_PERMIT_READ |
| 0016 | 22 | 0x2901 | GATT_CHAR_USER_DESC_UUID | alarm_deli | GATT_PERMIT_READ |
| 0017 | 23 | 0x2803 | GATT_CHARACTER_UUID | 08:18:00:03:FD | GATT_PERMIT_READ |
| 0018 | 24 | 0xFD03 | RAW_BYTE_UUID | 00 | GATT_PERMIT_WRITE |
| 0019 | 25 | 0x2901 | GATT_CHAR_USER_DESC_UUID | listening_control | GATT_PERMIT_READ |

UNIT FOR COMMUNICATION BY MEANS OF A PREDETERMINED PROTOCOL

TECHNICAL FIELD OF THE INVENTION

The present invention relates to a communication unit based on a determined protocol. The technical field of the invention is, in a general manner, that of the communications between a master entity and a slave entity, and more particularly that of the communications between a vehicle remote control electronic key and an intelligent mobile telephone (or "smartphone").

TECHNOLOGICAL BACKGROUND OF THE INVENTION

Vehicle remote control electronic keys have been known for several years. In a known manner, certain keys possess a listening mode in which a key is able to receive information transmitted by a vehicle, by Ultra High Frequency (UHF) or Low Frequency (LF) link. The information indicates for example that a door of the vehicle has been forced, that a tire has burst, or that a window pane has been broken. When an item of information is received by the key, the key can signal same for example by emitting a noise.

Moreover, some of these keys are also able to transmit the information from the vehicle to a master entity of smartphone, PDA, or laptop computer type. Communication between the key and the master entity is conventionally performed by bluetooth protocol, by bluetooth low energy protocol, or by NFC protocol.

Conventionally, a vehicle key having a bluetooth or bluetooth low energy component, and able to communicate with a master entity, is able to take three states:
  idle, in which the key neither receives nor emits signals, and is not connected to any other entity;
  discoverable, in which the key periodically emits presence messages;
  connected, in which the key is connected to the master entity.

To exchange information, the key must be in the connected state. Prior to connection, the key must have been initially pinpointed by the master entity via the presence signals emitted in the discoverable state. Thus, to be able to communicate with the smartphone, the discoverable and connected states are invoked often, since the key must remain in the discoverable or connected state when the user needs it.

Now, the discoverable state, the connected state and the listening mode consume energy, thereby considerably reducing the lifetime of the battery of the key.

GENERAL DESCRIPTION OF THE INVENTION

The subject of the invention offers a solution to the problem which has just been set forth, by proposing a solution making it possible to conserve the battery of the key.

According to a first aspect, the invention therefore relates essentially to a communication unit based on a determined protocol, said communication unit comprising:
  a master entity;
  a slave entity able to communicate with a vehicle according to a UHF or LF protocol, and able to take several states;

characterized in that the master entity is adapted for dispatching alarms for activating at least one state to the slave entity.

By virtue of the definition of the activation alarms, the states of the slave entity are automatically adapted to the needs of the user of the master entity. The various energy-consuming states are thus not used more than necessary.

In addition to the main characteristics which have just been mentioned in the previous paragraph, the communication unit according to the invention can exhibit one or more complementary characteristics from among the following, considered individually or according to the technically possible combinations:
  the master entity and the slave entity are able to communicate by bluetooth protocol or by bluetooth low energy (BLE) protocol.
  the slave entity is able to take the following states:
  idle, in which the slave entity neither receives nor emits signals, and is not connected to any entity;
  discoverable, in which the slave entity periodically emits presence signals;
  connected, in which the slave entity is connected to the master entity,
  listening mode, in which the slave entity is able to receive signals from the vehicle by UHF or LF protocol,
  and in that the states activated by the activation alarms are:
  the idle state,
  the discoverable state,
  the listening mode state.
  when the slave entity is in the connected state, the master entity is able to dispatch to it a duration cue whose value corresponds to the duration of activation of said state of the slave entity.
  when the slave entity is in the connected state, the master entity is able to dispatch alarms to it for deactivating said state of the slave entity.
  the slave entity comprises an inertial wakeup device able to switch the slave entity from the idle state to the discoverable state.
  the master entity and the slave entity are able to communicate by NFC protocol.

According to the nonlimiting embodiment of NFC communication, in nonlimiting embodiments:
  the state activated by the activation alarms is a listening mode state in which the slave entity is able to receive signals from the vehicle by UHF or LF protocol.
  the master entity is able to dispatch to the slave entity a duration cue whose value corresponds to the duration for which the slave entity must remain in the listening mode state.
  the master entity is able to dispatch to the slave entity alarms for deactivating the listening mode state.
  the master entity is able to dispatch a cue for clock synchronization to the slave entity.
  the master entity is able to dispatch a cue for clock synchronization to the slave entity.
  the master entity and the slave entity form a single entity comprising a man machine interface.
  the activation alarms are dispatched by means of the man machine interface.

The invention and its various applications will be better understood on reading the description which follows and on examining the figures which accompany it.

BRIEF DESCRIPTION OF THE FIGURES

The figures are presented merely by way of wholly nonlimiting indication of the invention.

The figures show:
in FIG. 3, a GATT profile table defining alarms implemented within the communication unit, under the BLE protocol, according to a nonlimiting embodiment of the invention; and
in FIG. 4, a GATT profile table defining a listening mode implemented within the communication unit, under the BLE protocol, according to a nonlimiting embodiment of the invention.

DETAILED DESCRIPTION OF AT LEAST ONE EMBODIMENT OF THE INVENTION

Figure 1:
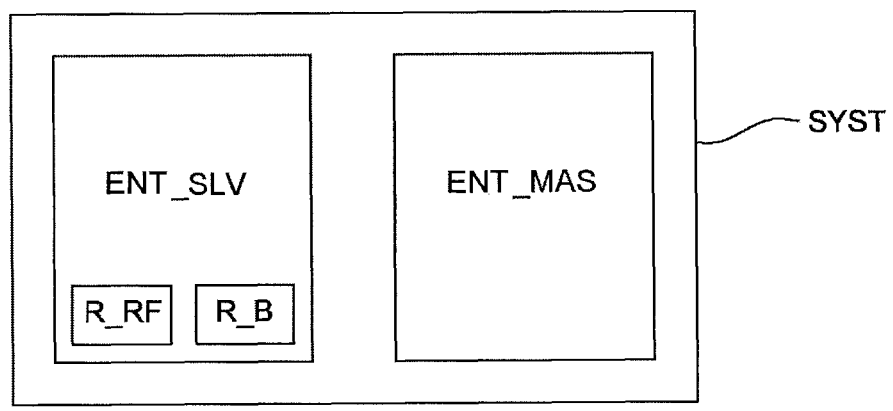
in FIG. 1, a diagram representing a communication unit according to a nonlimiting embodiment of the invention.

FIG. 1 is a diagram representing a communication unit SYST according to one embodiment of the invention, said communication unit SYST comprising:
a slave entity ENT_SLV
a master entity ENT_MAS comprising a man machine interface (MMI)

According to a nonlimiting embodiment of the invention, the slave entity ENT_SLV is an electronic key of the vehicle, and the master entity ENT_MAS is a smartphone. According to other embodiments of the invention, the master entity ENT_MAS is a PDA, a laptop computer, etc.

In another embodiment, the master entity ENT_MAS and the slave entity ENT_SLV form just a single entity comprising an MMI and capable of communicating with a vehicle. This entity is either the vehicle's remote control key, or the smartphone.

The slave entity ENT_SLV comprises an RF transmitter/receiver R_RF, and has a listening mode state, also called the vehicle monitoring mode, in which it is able to receive information from the vehicle via the RF transmitter/receiver R_RF, by UHF or LF protocol.

In a nonlimiting embodiment, the master entity ENT_MAS and the slave entity ENT_SLV communicate by NFC protocol. Provision may also be made to configure the slave entity ENT_SLV so as to lock/unlock the automotive vehicle contactlessly ("Remote Keyless Entry" or RKE), such as the locking/unlocking of the vehicle's central locking system, by simply bringing the slave entity ENT_SLV close to the vehicle for communication according to the NFC protocol.

The NFC protocol is a short-range wireless link, with a range of the order of a few centimeters, which uses a data exchange protocol based on radio frequencies of very short range. This is an extension of the radio-identification techniques which, while being based on the ISO/IEC 14443 standard, allows communication between peripherals in peer-to-peer mode. The NFC protocol is based on inductive coupling and load modulation at the level of a slave apparatus.

NFC technology is currently being developed by an industrial consortium grouped under the name NFC Forum. NFC technology is derived from RFID (Radio Frequency Identification) technology and uses NFC processors or components exhibiting several operating modes, especially a reader mode and a card emulation mode.

In reader mode, an NFC processor operates as a conventional RFID reader for read-access or write-access to an RFID chip. The NFC processor emits a magnetic field, dispatches data by modulation of the amplitude of the magnetic field and receives data by load modulation and inductive coupling. This mode is also referred to as active mode since the NFC processor emits a magnetic field in this mode.

In the emulation mode, an NFC processor operates in a passive fashion in the manner of a transponder in order to dialog with another reader and be seen by the other reader as an RFID chip. The processor does not emit any magnetic field, receives data by demodulating a magnetic field emitted by the other reader and emits data by modulation of the impedance of its antenna circuit (load modulation). This mode is also referred to as passive mode, since the NFC processor does not emit any magnetic field in this mode.

Other modes of communication can be implemented, especially a so-called "device" mode where a component must pair with another NFC processor in the same operating mode, each NFC processor places itself alternately in a passive state (no field emission) to receive data and in an active state (with field emission) to emit data.

In these three operating modes, an NFC processor can implement several contactless communication protocols for example ISO 14443-A, ISO 14443-B or ISO 15693. Each protocol defines a frequency of emission of the magnetic field, a procedure for modulating the amplitude of the magnetic field to emit data in active mode, and a procedure for load modulation by inductive coupling to emit data in passive mode.

A certain number of standards define the NFC protocol:
NFCIP-1 (ISO/IEC 18092) defines the interface and the communication protocol between two NFC peripherals;
ISO/IEC 14443-1 to ISO/IEC 14443-4 define the communication with contactless integrated circuits;
NDEF (NFC Data Exchange Format) defines the logical exchange format for data.

NFC communication generally exhibits the following characteristics:
Communication bitrates: 106, 212, 424 or 848 kbit/s;
Frequency range: 13.56 MHz;
Communication distance: about 10 cm;
Communication mode: half-duplex or full-duplex.

In this embodiment, the slave entity ENT_SLV comprises an NFC (Near Field Communication) component, and is able to take two states:
a passive state (also called reader mode) in which the NFC component emits a magnetic field, dispatches data by modulation of the amplitude of the magnetic field and receives data by load modulation and inductive coupling;
an active state (also called emulation mode) in which the NFC component does not emit any magnetic field, receives data by demodulating a magnetic field emitted by another reader and emits data by modulation of the impedance of its antenna circuit (load modulation).

In another nonlimiting embodiment, the slave entity ENT_SLV comprises a bluetooth or bluetooth low energy component R_B, and is able to take three states:
idle, in which the slave entity ENT_SLV neither receives nor emits signals, and is not connected to any entity;
discoverable (or advertising), in which the slave entity ENT_SLV periodically emits presence messages;
connected, in which the slave entity ENT_SLV is connected to the master entity ENT_MAS.

The master entity ENT_MAS can also take several states:
idle, in which the master entity ENT_MAS neither receives nor emits signals, and is not connected to any other entity;

scanning, in which the master entity ENT_MAS searches for the presence signals, emitted by a slave entity ENT_SLV when the latter is in the discoverable mode;

initiating, in which the master entity ENT_MAS is able to establish a connection with the slave entity ENT_SLV when the latter is in the discoverable mode;

connected, in which the master entity ENT_MAS is connected to the slave entity ENTSLV.

When the master entity ENT_MAS and the slave entity ENT_SLV are connected, the master entity ENT_MAS is able to dispatch alarms to the slave entity ENT_SLV for activating a state (the discoverable state and the idle state of the slave entity ENT_SLV, in the case of bluetooth or bluetooth low energy). Moreover, the master entity ENT_MAS is able to dispatch alarms to the slave entity ENT_SLV for activating and deactivating the listening mode state (whether in the case of bluetooth or bluetooth low energy or NFC). It will be noted that the master entity ENT_MAS is able to dispatch alarms for activating several states at a time.

By "alarm for activating a state", also called rendezvous, is meant a value of time of activation of the state. Thus, the user of the master entity can set time spans for automatic vehicle idling and monitoring.

In another nonlimiting embodiment of the invention, the master entity ENT_MAS is able to dispatch alarms for activating the listening mode state and a duration cue (or "timer") corresponding to the duration for which the slave entity ENT_SLV must remain in the listening mode state. These activation and/or deactivation alarms, and/or this duration cue, make it possible to define time spans of activation of states. In a nonlimiting embodiment of the invention, the alarms for activating and/or for deactivating states, and/or the duration cue, are determined by the user of the master entity ENT_MAS.

Moreover, the master entity ENT_MAS is able to dispatch a clock synchronization cue to the slave entity ENT_SLV.

In a particular embodiment, when the master entity ENT_MAS and the slave entity ENT_SLV are connected and an alarm for activating the idle state is triggered, it is preferable to wait for the connection between the master entity ENT_MAS and the slave entity ENT_SLV to terminate before effecting the idling of the slave entity ENT_SLV. Indeed the user does not wish to see his slave entity ENT_SLV become idle while busy carrying out operations. In this precise case and subsequent to intentional or unintentional disconnection (out of range), the slave entity ENT_SLV will not switch from the connected state to the discoverable state, and from the discoverable state to the idle state, but it will switch directly from the connected state to the idle state.

In an alternative, the user will be able to be informed on his slave entity ENT_SLV that the setting to idle alarm has just been triggered. He will then be able to grant or otherwise authorization for the slave entity ENT_SLV to be set to idle by forcing disconnection of the master entity ENT_MAS. These operations occur by way of messages or pop-ups on the screen of the slave entity ENT_SLV and by response action of the user on the slave entity ENT_SLV (pressing of buttons or pressing on an area of the touchscreen).

In a second alternative which favors energy economy, the slave entity ENT_SLV will switch from the connected state to the idle state immediately upon the triggering of an alarm for activating the idle state without request for confirmation of the user.

Figure 2:
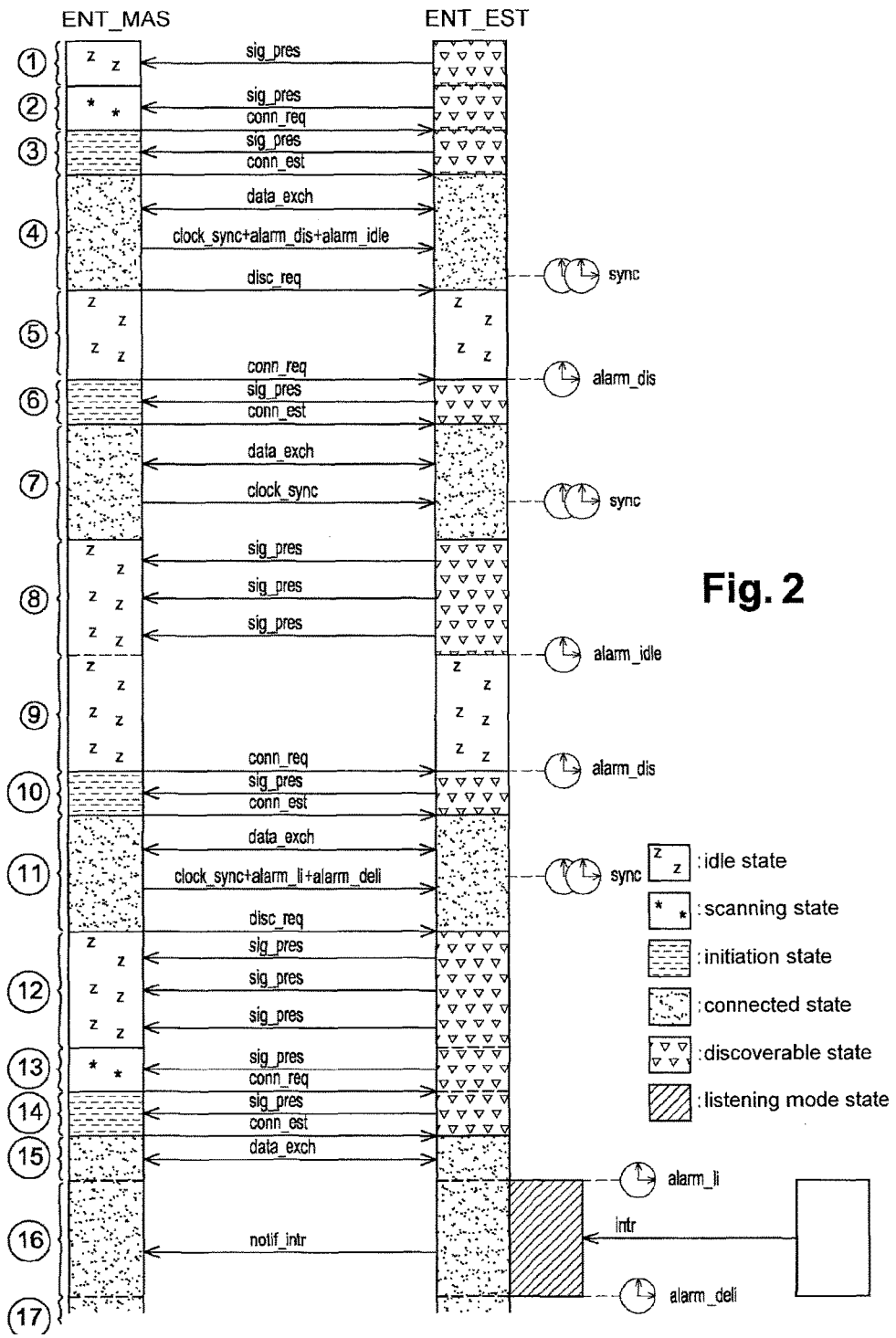
in FIG. 2, a timing diagram representing exchanges of information within the communication unit, according to a nonlimiting embodiment of the invention.

FIG. 2 is a timing diagram representing exchanges of information between the master entity ENT_MAS and the slave entity ENT_SLV, according to a nonlimiting embodiment of the invention in which the master entity ENT_MAS and the slave entity ENT_SLV communicate by Bluetooth or Bluetooth Low Energy (BLE) protocol. In the Bluetooth protocol, the alarms are defined according to the communication specifications of the Bluetooth standard. In the example illustrated:

from step 1 to step 9, an illustration of the dispatching and the use of an alarm for activating the discoverable state alarm_dis and an alarm for activating the idle state alarm_idle.

from step 10 to step 17, an illustration of the dispatching and of the use of an alarm for activating the listening mode state alarm_li and an alarm for deactivating the listening mode state alarm_deli, and an illustration of a case in which there is a vehicle intrusion.

Step 1: The slave entity ENT_SLV is in the discoverable state, it therefore periodically emits signals of presence sigpres. The master entity ENT_MAS is in the idle state.

Step 2: A user of the master entity ENT_MAS triggers the scanning mode of said master entity ENT_MAS. The master entity ENT_MAS then detects the signals of presence sig_pres of the slave entity ENT_SLV. Having detected the signals of presence sig_pres of the slave entity ENT_SLV, the master entity ENT_MAS automatically switches to the initiation state, and dispatches a connection request conn_req to the slave entity ENT_SLV.

Step 3: The connection between the master entity ENT_MAS and the slave entity ENT_SLV is established after a connection establishment request conn_est triggered by the user, directly or by pre-configuration.

Step 4: The master entity ENT_MAS and the slave entity ENT_SLV are connected to one another and exchange data data_exch. The master entity ENT_MAS dispatches the clock synchronization cues clock_sync as well as the alarm for activating the discoverable state alarm_dis and the alarm for activating the idle state alarm_idle, to the slave entity ENT_SLV. A clock synchronization sync between the slave entity ENT_SLV and the master entity ENT_MAS is performed. Next the master entity ENT_MAS disconnects from the slave entity ENT_SLV through a disconnection request disc_req.

Step 5: The master entity ENT_MAS and the slave entity ENT_SLV then switch to the idle state. The battery of the slave entity ENT_SLV is then conserved. Next the alarm for activating the discoverable state alarm_dis is triggered at the preset time.

Step 6: The slave entity ENT_SLV then automatically switches to the discoverable state. Simultaneously, the master entity ENT_MAS switches to the initiation state and dispatches a connection request conn_req to the slave entity ENT_SLV. The connection between the master entity ENT_MAS and the slave entity ENT_SLV is established after a connection establishment request conn_est accepted by the slave entity ENT_SLV.

Step 7: The master entity ENT_MAS and the slave entity ENT_SLV are connected to one another and exchange data data_exch. The master entity ENT_MAS dispatches the clock synchronization cues clock_sync to the slave entity ENT_SLV. A clock synchronization sync between the slave entity ENT_SLV and the master entity ENT_MAS is performed again. Next there is unintentional loss of connection.

Step 8: The master entity ENT_MAS then switches to the idle state, and the slave entity ENT_SLV switches back to the discoverable state, since the alarm for activating the idle state alarm_idle has not yet been triggered. The slave entity ENT_SLV periodically dispatches signals of presence sig_pres. Next the alarm for activating the idle state alarm_idle is triggered. It will be noted that the master entity may in another example attempt to connect to the slave entity, but if the latter is out of range, the slave entity ENT_SLV switches back to the discoverable state since the alarm for activating the idle state alarm_idle has not yet been triggered.

Step 9: The slave entity ENT_SLV then switches to the idle state. Next the alarm for activating the discoverable state alarm_dis is triggered.

Step 10: The slave entity ENT_SLV automatically switches to the discoverable state. Simultaneously, the master entity ENT_MAS switches to the initiation state and dispatches a connection request conn_req to the slave entity ENT_SLV. The connection between the master entity ENT_MAS and the slave entity ENT_SLV is established after a connection establishment request conn_est.

Step 11: The master entity ENT_MAS and the slave entity ENT_SLV are connected to one another and exchange data data_exch. The master entity ENT_MAS dispatches clock synchronization cues clock_sync and alarms for activating alarm_li and for deactivating the listening mode alarm_deli to the slave entity ENT_SLV. A clock synchronization sync between the slave entity ENT_SLV and the master entity ENT_MAS is performed again. Next the master entity ENT_MAS disconnects from the slave entity ENT_SLV after a disconnection request disc_req.

Step 12: The master entity ENT_MAS switches to the disconnected state, and the slave entity ENT_SLV switches back to the discoverable state, since the alarm for activating the idle state alarm_idle has not yet been triggered. The slave entity ENT_SLV periodically dispatches signals of presence sig_pres.

Step 13: The user of the master entity ENT_MAS triggers the scanning mode of said master entity ENT_MAS. The master entity ENT_MAS then detects the signals of presence sig_pres of the slave entity ENT_SLV, the latter being in the discoverable mode.

Step 14: Having detected the signals of presence sig_pres of the slave entity ENT_SLV, the master entity ENT_MAS automatically switches to the initiation state, and dispatches a connection request conn_req to the slave entity ENT_SLV. The connection between the master entity ENT_MAS and the slave entity ENT_SLV is established subsequent to a connection establishment request conn_est.

Step 15: The master entity ENT_MAS and the slave entity ENT_SLV are connected to one another and exchange data data_exch.

Step 16: The alarm for activating the listening mode state alarm_li is triggered. The slave entity ENT_SLV then switches to the listening mode state. Periodic exchanges may or may not be made between the master entity ENT_MAS and the slave entity ENT_SLV to monitor the proper operation of the listening mode. At a given moment, the vehicle dispatches an intrusion cue intr to the slave entity ENT_SLV. The slave entity ENT_SLV then automatically dispatches an intrusion notification notif_intr to the master entity ENT_MAS.

Step 17: The alarm for deactivating the listening mode alarm_deli is triggered. The slave entity ENT_SLV leaves the listening mode state.

In the other embodiment of the invention where a duration cue is used in place of the alarm for deactivating the listening mode state alarm_deli, the slave entity ENT_SLV leaves the listening mode state when the time elapsed from the instantaneous activation (namely the triggering of the activation alarm) of the listening mode state alarm_li is equal to the duration corresponding to the duration cue. Indeed the duration cue corresponds to the duration for which the slave entity ENT_SLV is in the listening mode.

In another embodiment of the invention, the slave entity ENT_SLV comprises an inertial wakeup device able to switch the slave entity ENT_SLV from the idle state to the discoverable state. It is noted that the slave entity ENT_SLV may have a state called the super_idle state, which corresponds to the idle state with which is associated another characteristic: the internal clock of the slave entity ENT_SLV is deactivated. In the case where the slave entity has a super_idle state, the inertial wakeup device is also able to switch the slave entity ENT_SLV from the super_idle state to the discoverable state. The inertial wakeup device is for example an accelerometer, a very low consumption inertial sensor or a passive mechanical breaker with unbalance mass.

In the Bluetooth Low Energy (BLE) protocol, in a nonlimiting embodiment, the alarms are defined according to a table of attributes, dubbed the GATT (Generic Attribute Table) profile table, a nonlimiting example of which is represented in FIG. 3. This table relates solely to the BLE protocol, in the other embodiments of the invention, the alarms are implemented according to the communication specifications of the bluetooth or NFC standards. The GATT table is created in the slave entity ENT_SLV during its manufacture, and is able to be used (read and/or modified) by the master entity ENT_MAS.

Each row of the table corresponds to an attribute. The table comprises 4 columns:
  an Address column, dubbed "Handle" according to the BLE protocol, corresponding to the logical address of the attribute in the table. The address is given in hexadecimal and in decimal;
  a Type column, indicating the type of the attribute. The type is given by a value in hexadecimal and by a name.
  a Value column, indicating the value of the attribute;
  a Permissions column, indicating whether and how the master entity ENT_MAS may have access to the value of the attribute.

The table is divided into services. FIG. 3 illustrates a first service starting at row 1 and terminating at row 14. Each service is divided into characteristics. In the example represented, the first service comprises 4 characteristics: a first characteristic starts at row 2 and terminates at row 5; a second characteristic starts at row 6 and terminates 8, a third characteristic starts at row 9 and terminates at row 11, and a fourth characteristic starts at row 12 and terminates at row 14.

The attribute of row 1 corresponds to the declaration of the start of the first service. The type of a service start declaration attribute is 0x2800. The value of a service start declaration attribute is coded on 2 bytes. Here the value is 0xFE00, this being coded by 00:FE. The master entity ENT_MAS can only read the service start attribute, not modify it, this being indicated by the permission GATT_PERMIT_READ.

The first characteristic starts at row 2. It terminates at row 5. The first characteristic defines the synchronization clock clock_sync, described previously. Said synchronization clock clock_sync will subsequently be used to undertake a clock synchronization sync between the master entity ENT_MAS and the slave entity ENT_SLV (a write resynchronizes the time of the slave entity ENT_SLV, a read or a notification makes it possible to provide the master entity ENT_MAS with the time of the slave entity ENT_SLV).

The attribute of row 2 corresponds to the declaration of the first characteristic. A characteristic declaration attribute is of type 0x2803. The value of a characteristic declaration attribute is coded on 5 bytes:

- the first two bytes indicate the type of the characteristic (here 0xFE01, coded by 01:FE)
- the following two bytes indicate the address at which the value of the characteristic is situated (here 0x0011, coded by 11:00, thus signifying that the value of the characteristic is provided at the address 0011, that is to say at the third row of the table)
- the last byte indicates the permissions of the characteristic (here 1A). 02 signifies read only, 08 signifies write only, 0A signifies read and write, 1A signifies read, write and notifications.

The master entity ENT_MAS can only read the characteristic declaration attribute, not modify it, as indicated by the permission GATT_PERMIT_READ.

The attribute of row 3 corresponds to the value of the first characteristic. This value is coded on 3 bytes (here 00:00:00). In the example described, the value corresponds to the clock value for the synchronization clock_sync, in hours/minutes/seconds (hh:mm:ss). In another embodiment, the clock value is coded according to the RFC868 protocol that is to say by a number of 32 bits representing the number of seconds since 00:00:00 (midnight) on the first of January 1900 GMT, the value 1 or 0x00000001 representing 00:00:01 on the first of January 1900 GMT. The master entity ENT_MAS can read and modify this value, as indicated by the permission GATT_PERMIT_WRITE|GATT_PERMIT_READ.

The attribute of row 4 corresponds to information for configuring the master entity ENT_MAS. A configuration attribute has type 0x2902. The value of a configuration attribute is coded on 2 bytes. This value indicates whether messages of notification type or of indication type, which are defined according to the BLE protocol, are authorized between the master entity ENT_MAS and the slave entity ENT_SLV. The notification messages do not require the slave entity ENT_SLV to dispatch an acknowledgment of receipt to the master entity ENT_MAS, in contradistinction to the indication messages. The notifications are coded by 01, the indications are coded by 02. The master entity ENT_MAS can read and modify this value, as indicated by the permission GATT_PERMIT_WRITE|GATT_PERMIT_READ.

The attribute of row 5 corresponds to information intended for the user of the master entity ENT_MAS. A user information attribute has type 0x2901. In the example described, the value of this attribute is "clock". Thus, the user of the master entity ENT_MAS will see "clock" displayed on the MMI of the master entity ENT_MAS at the moment of clock synchronization. The master entity ENT_MAS can only read this attribute, not modify it, as indicated by GATT_PERMIT_READ.

The second characteristic, rows 6 to 8 of the table, defines the alarm for activating the discoverable state alarm_dis; the third characteristic, rows 9 to 11 of the table, defines the alarm for activating the idle state alarm_idle, and the fourth characteristic, rows 12 to 14 of the table, defines the states of the synchronization clock clock_sync, of the alarm for activating the discoverable state alarm_dis, and of the alarm for activating the idle state alarm_idle. The states are indicated by the value of the fourth characteristic: 0 signifies that everything is deactivated, 3 signifies that the alarm for activating the discoverable state alarm_dis is activated, 5 signifies that the alarm for activating the idle state alarm_idle is activated, and 7 signifies that both alarms are activated. The second, the third and the fourth characteristic are filled in in the same manner as the first characteristic.

FIG. 4 illustrates a second service relating to RF listening to the vehicle by the slave entity ENT_SLV. The corresponding table is filled in in the same manner as the table corresponding to the first service.

The writing and the reading of the attributes of the GATT profile table is done in a known manner by means of writing and reading messages such as described in the V4 BLE standard p. 1929 and p. 1871.

Thus when the user of the master entity ENT_MAS defines the alarms via the master entity ENT_MAS, the latter will write the values of the alarms defined by dispatching data packets to the slave entity ENT_SLV. The values will thus be written in the GATT table. The slave entity ENT_SLV will thus read the values of the alarms in its table so as to place itself in the various states described previously. The master entity ENT_MAS will read the GATT table to display messages on the MMI for the user.

Of course the description of the invention is not limited to the application, to the embodiments and to the examples described hereinabove.

Thus, in a nonlimiting embodiment, when the master entity ENT_MAS and the slave entity form just a single entity and this single entity is the vehicle's remote control key, the latter comprises an MMI which, by combining presses of the key, makes it possible to dispatch the alarms for activating a state. Thus, for example, it is possible to perform a double press for 5 seconds to activate/deactivate an alarm on the button normally used to activate the key, and then several times on the button which is normally used to lock the vehicle to set the activation/deactivation hour, and several times on the button normally used to unlock the vehicle to set the activation/deactivation minutes. In another nonlimiting example, the MMI of the key can be a touchscreen. In another nonlimiting example, the MMI of the key can be a screen (such as LCD or digit and pictogram matrix, OLED, etc.) associated with buttons (such as keypad, joystick, numerical pad, etc.).

Of course, the single entity can also be a smartphone which also comprises the same type of MMI (whether with or without screen).

The invention claimed is:

1. A communication unit (SYST) based on a determined protocol, said communication unit (SYST) comprising:
    a master entity (ENT_MAS);
    a slave entity (ENT_SLV) configured to communicate with a vehicle according to a UHF or LF protocol, and configured to take several states
    wherein said master entity (ENT_MAS) and said slave entity (ENT_SLV) communicate according to Bluetooth, Bluetooth Low Energy (BLE) or NFC protocol,
    said slave entity (ENT_SLV) being configured to take, of the several states, the following states from the Bluetooth or BLE protocol:
        an idle state, in which the slave entity (ENT_SLV) neither receives nor emits signals, and is not connected to any entity,
        a discoverable state, in which the slave entity (ENT_SLV) periodically emits presence signals (sig_pres), and
        a connected state, in which the slave entity (ENT_SLV) is connected to the master entity (ENT_MAS),
    said slave entity (ENT_SLV) being configured to take, of the several states, the following states from the NFC protocol:

an active/reader state, and
a passive/emulation state,
said slave entity (ENT_SLV) being further configured to take, of the several states, the following state:
a listening mode state, in which the slave entity (ENT_SLV) receives signals from the vehicle by the UHF or LF protocol,
wherein when the master entity (ENT_MAS) and the slave entity (ENT_SLV) are connected in the connected state according to the Bluetooth or BLE protocol, or are connected in the NFC protocol, the master entity (ENT_ MAS) dispatches activation alarms that activate the listening mode state of the slave entity (ENT_SLV),
wherein each of the activation alarms are a value that sets a time of activation of the listening mode state and a duration for which the slave entity (ENT_SLV) must remain in at least the listening mode state.

2. The communication unit (SYST) as claimed in claim 1, wherein when the master entity (ENT_MAS) and the slave entity (ENT_SLV) are connected by the Bluetooth or BLE protocol, the master entity (MAS_ENT) is further configured to dispatch alarms for activating the idle state or the discoverable state of the slave entity (ENT_SLV).

3. The communication unit (SYST) as claimed in claim 1, wherein, when the slave entity (ENT_SLV) is in the connected state, the master entity (ENT_MAS) is configured to dispatch to it a duration cue whose value corresponds to the duration of activation of the connected state of the slave entity (ENT_SLV).

4. The communication unit (SYST) as claimed in claim 1, wherein, when the slave entity (ENT_SLV) is in the connected state, the master entity (ENT_MAS) is configured to dispatch alarms to it for deactivating the connected state of the slave entity (ENT_SLV).

5. The communication unit (SYST) as claimed in claim 1, wherein the slave entity (ENT_SLV) comprises an inertial wakeup device configured to switch the slave entity (ENT_SLV) from the idle state to the discoverable state.

6. The communication unit (SYST) as claimed in claim 1, wherein, when the slave entity (ENT_SLV) is connected with the master entity (ENT_MAS) in the Bluetooth, BLE or NFC protocol, the master entity (ENT_MAS) is configured to dispatch alarms to it for deactivating the listening mode state.

7. The communication unit (SYST) as claimed in claim 1, wherein the master entity (ENT_MAS) is configured to dispatch a cue for clock synchronization (clock_sync) to the slave entity (ENT_SLV).

8. The communication unit (SYST) as claimed in claim 1, wherein the master entity (ENT_MAS) is an intelligent mobile telephone, and the slave entity (ENT_SLV) is a vehicle remote control electronic key.

* * * * *